United States Patent [19]

Raden et al.

[11] 4,255,528

[45] Mar. 10, 1981

[54] POLYURETHANE PROCESS

[75] Inventors: Daniel S. Raden, Hawthorn Woods; Chala V. Maripuri, Skokie; Frank C. Becker, Gurnee, all of Ill.

[73] Assignee: Abbott Laboratories, North Chicago, Ill.

[21] Appl. No.: 78,354

[22] Filed: Sep. 24, 1979

Related U.S. Application Data

[63] Continuation of Ser. No. 963,483, Nov. 24, 1978, abandoned.

[51] Int. Cl.³ .................................................. C08J 9/14
[52] U.S. Cl. .................................... 521/129; 521/131; 528/53
[58] Field of Search .................. 521/129, 131; 528/53

[56] References Cited

U.S. PATENT DOCUMENTS 3,836,488  9/1974  Pruitt et al. ........................... 521/129

FOREIGN PATENT DOCUMENTS 2624528  12/1977  Fed. Rep. of Germany .

*Primary Examiner*—Morton Foelak
*Attorney, Agent, or Firm*—Paul D. Burgauer; Robert L. Niblack

[57] ABSTRACT

The use of catalytic amounts of tris(3-dimethylaminopropyl)amine promotes the formation of urethane linkages. Its unusual activity and properties make this compound very useful in the manufacture of rigid polyurethanes.

11 Claims, No Drawings

POLYURETHANE PROCESS

This is a continuation of application Ser. No. 963,483, filed Nov. 24, 1978, now abandoned.

DETAILED DESCRIPTION OF THE INVENTION

Polyurethanes have been finding wider and wider industrial use. It has been learned that the two major components needed to make urethane polymers, the polyisocyanate and the polyhydroxy compound, are not the only materials that affect the ultimate physical properties of the polymer. These properties, appearance, odor etc. are also often affected by the catalyst used for the polymerization reaction.

Many of the catalysts used today are tertiary mono- and di-amines. Among these are N,N,N',N'-tetramethylethylenediamine, triethylamine, N,N-dimethylcyclohexylamine, N-methylmorpholine and triethylenediamine which have proven useful alone or in mixtures with one another or other catalysts. However, use of these materials has been reduced somewhat because of their low vapor-pressure and the unpleasant odors which are the result thereof. These tertiary amines produce objectionable odors in the formulated foam as well as in the laboratory or plant where they are used or where the foams are produced.

It has now been found that excellent results can be obtained by forming urethane polymers in the presence of a tetra-tertiary amine catalyst.

The current invention is thus directed to the process of preparing polyurethanes by using tris(3-dimethylaminopropyl)amine (hereinafter referred to as TDA) at catalytically active levels. These levels ordinarily are 0.02–4.0% by weight of the chosen polyol in the polymerization reaction of the present invention.

The TDA can be made by the method described in German Offenlegungsschrift No. 26 24 528. It performs like most other polyurethane catalysts but has a number of advantages over many of them. It is a relatively inexpensive material; only small amounts are required to produce the desired catalytic action; it is practically odorless, and it is easily soluble in water and miscible or compatible with most other additives in polyurethane foam formulations commonly used to achieve special properties, i.e., other amine catlysts, polyols, blowing agents, surfactants, pigments, dyes, etc.

In addition to the enumerated characteristics, TDA produces highly desirable rise and set times: It promotes the urethane reaction at a speed slow enough to assure a substantially uniform and homogeneous foam or cell structure, yet it is fast enough to make it suitable for use in processing equipment operating in a continuous manner.

In a general embodiment, the polyurethane is formed by combining the desired polyol with TDA. This mixture is stable and may be stored for extended periods of time; it may also contain other additives often employed in the manufacture of urethane foams, particularly blowing agents, surfactants or other catalysts. However, pigments and/or dyes are preferably not added if this mixture is intended to be stored for some time. Those skilled in the art will be aware that in using certain polyols, additives of any type drastically reduce storability. The polyol/TDA mixture is then combined in the usual fashion with the selected polyisocyanate in a batch operation involving preferably a period of agitation from 5–30 seconds or in a continuous operation. This operation is usually carried out at room temperature, but it can be carried out between 0° and 40° C.

In order to illustrate the above general procedure, reference is made to the following specific embodiments which, however, are not meant to limit the invention in any respect.

EXAMPLE 1

To a mixture of 50 parts of a polyoxypropylene polyol of functionality f=4.4; (marketed by Dow Chemical Company as Voranol ® 490), 0.75 parts of a silicone-glycol copolymer surfactant (marketed by Dow-Corning Corporation as DC-195), 18.25 parts of trichlorofluoromethane and the amount of TDA shown below, were added 63.3 parts of a mixture of aromatic polyisocyanates having an average isocyanate content of 31.5% (marketed by Mobay Chemical Company as Mondur ® MR). This batch was mixed for 10 seconds at 1800 rpm and poured into a one-gallon ice-cream container where it was allowed to rise freely. The characteristics for the new catalytic process are given in Table I, along with the characteristics obtained when using two commercially available methane catalysts: N,N-dimethylcyclohexylamine (DMCHA) and an approximate 20 weight % solution of triethylene diamine in N,N-dimethylethanolamine (sold by Air Products Corporation as Dabco ® R-8020). Use of TDA produced an odorless rigid foam having physical properties equal to or better than foams made with previously known catalysts.

Table I

| 1.6% Catalyst Level | TDA | DMCHA | R-8020 |   |
|---|---|---|---|---|
| Final rise height | 5.6 | 5.3 | 5.45 | inches |
| Initiation time | 45 | 77 | 62 | seconds |
| Rise time | 110 | 167 | 144 | seconds |
| Foaming time | 65 | 90 | 82 | seconds |
| Rectivity index | 0.59 | 0.54 | 0.57 |   |
| Maximum rise rate | 7.4 | 5.33 | 5.6 | inch/min. |
| Velocity index | 1.15 | 0.42 | 0.54 |   |
| Specific rise rate | 1.32 | 1.00 | 1.03 | minute$^{-1}$ |

The above table shows the superiority of TDA over other commercially-used catalysts in that initiation foam and rise times are lower, while velocity index, maximum rise rate, specific rise rate, rise height and reactivity index are all greater.

EXAMPLE 2

The determination of gel times using the above catalysts according to the method of Britain et al., *J. App. Poly. Sci.* 4, 207 (1960) shows the following results:

| DMCHA | 90 minutes |
|---|---|
| R-8020 | 55 minutes |
| TDA | 48 minutes |

This comparison clearly shows the superiority of the catalyst used in this invention.

EXAMPLES 3–6

By using the formulations listed in Table II, various polyols, polyisocyanates, blowing agents and surfactants were processed into rigid foams according to the present invention with TDA and for comparison, with the conventional catalysts described above.

The polyols used are a polyoxypropylene polyol of OH-number 600-630 based on a sucrose/amine initiator (sold as Voranol ® 575 by the Dow Chemical Company), a polyether polyol of OH-number 350-370 based on a mixed sucrose/diol initiator (sold as Voranol ® 360), a polyoxypropylene polyol of OH-number of about 530 based on a sucrose/amine initiator (marketed by Olin Corporation as Poly G ® 71-530), or a polyoxypropylene polyol of OH-number 500, based on a sucrose/amine initiator (marketed by BASF-Wyandotte Corp. as Pluracol ® 364).

The surfactants are similar to those of Example 1; the blowing agents are water or $CFCl_3$. Also used, as a flame retardant, is a hydroxy-terminated phosphonate ester (marketed as Fyrol ® 6 by Stauffer Chemical Company).

The polyisocyanates are a polymethylene polyphenylisocyante with f=2.7, average NCO content=31.5% (marketed by Mobay Company as Mondur ® MR) or a crude toluene diisocyanate (marketed by duPont Company as Hylene ® TIC) used at the indices listed.

The formulations below produce the shown process parameters, all parts are given by weight and all times in seconds. All formulations were mixed for 10 seconds at 2800 rpm in all instances.

TABLE II

| EXAMPLE | 3 | 4 | 5 | 6 |
|---|---|---|---|---|
| Polyol G 71-530 | 100 | | | |
| Pluracol 364 | | 100 | | |
| Voranol 575 | | | 100 | |
| Voranol 360 | | | | 100 |
| Surfactant DC-193 | 1.5 | 1.2 | 1 | 0.94 |
| Blowing Agent: Water | | | | 0.625 |
| $CFCl_3$ | 37.7 | 47 | 45 | |
| Isocyanate Mondur (index) | 109 | | 107 | 102 |
| Hylene (index) | | 105 | | |
| Catalyst (% of Polyol) | 1.2 | 0.2 | 1.4 | 1.8 |
| Cream Time with TDA | 31 | 13 | 21 | 31 |
| R-8020 | 34 | 13 | 21 | 36 |
| DMCHA | 38 | 14 | 25 | 32 |
| Gel Time with TDA | 87 | 66 | 45 | 72 |
| R-8020 | 90 | 71 | 45 | 76 |
| DMCHA | 106 | 68 | 49 | 84 |
| Rise Time with TDA | 128 | 108 | 73 | 91 |
| R-8020 | 129 | 127 | 77 | 98 |
| DMCHA | 151 | 120 | 84 | 106 |

From the above results, it will be apparent that with very small amounts of TDA, excellent results are obtained. In all instances where TDA is used as the catalyst, the system has improved reactivity and the formed urethane foam has physical properties substantially the same as when older catalysts are used; however, TDA has the advantage over older catalysts in that the foam process area and, particularly, the resulting foam is free of amine odors as a whole or on a freshly cut surface. This is the case at TDA levels up to 4% by weight of the amount of the polyol used. In most previously known catalysts, only smaller catalyst levels produce odorless cutting surfaces. TDA performs well in the presence or absence of other catalysts and/or blowing agents and may also be used in formulations designed for rigid, semi-rigid or flexible foams.

While more than 4% TDA could be used, no advantage is gained thereby, since from the combined catalytic and economic viewpoint, amounts of 0.05–1.5% produce excellent results. Also, the current process may be carried out at temperatures above 40° C., where, however, the reaction speed becomes too fast to be controllable.

As is well known by those skilled in the art, rigid foams ordinarily are made in the absence of an organic tin compound. However, some foam formulations use tetravalent tin salts such as dibutyl tin dilaurate and the like. Usually, tin catalysts are used in amounts of 0.05 to 1.5% by weight based on the weight of the polyol used.

Numerous blowing agents are also well known in the art and are used at various amounts depending on the density desired in the final product. The most economical of such agents is water, but frequently, halogenated short chain alkanes carrying chlorine and/or fluorine are used alone or in combination with water. Blowing agents are often used in amounts ranging up to 50% of the weight of the polyol. For certain uses however, as little as 0.5% of water is used as the blowing agent.

We claim:

1. The process of preparing a polyurethane foam consisting essentially in carrying out the polymerization reaction between a polyol and a polyisocyanate in the presence of catalytical amounts of tris(3-dimethylaminopropyl)amine at 0°–40° C. and in the presence of a blowing agent.

2. The process of claim 1 wherein said polyurethane is a rigid polyurethane foam.

3. The process of claim 2 wherein said amine is present in an amount of between 0.02 and 4.0% by weight of said polyol.

4. The process of claim 3 wherein said amount is between 0.05 and 1.5%.

5. The process of claim 2 wherein said polymerization reaction is carried out in the presence of 0.5–50% of a blowing agent.

6. The process of claim 5 wherein said blowing agent is water.

7. The process of claim 5 wherein said blowing agent is $CFCl_3$.

8. The process of claim 5 wherein said amine is present in an amount of between 0.02 and 4.0% by weight of said polyol.

9. The process of claim 8 wherein said amount is between 0.05 and 1.5%.

10. The process of claim 9 wherein said blowing agent is water.

11. The process of claim 8 wherein said blowing agent is $CFCl_3$.

* * * * *